United States Patent [19]
Nakabayashi

[11] Patent Number: 5,581,756
[45] Date of Patent: Dec. 3, 1996

[54] NETWORK DATABASE ACCESS SYSTEM TO WHICH BUILDS A TABLE TREE IN RESPONSE TO A RELATIONAL QUERY

[75] Inventor: Kazunori Nakabayashi, Tokyo, Japan

[73] Assignee: NEC Corporation, Tokyo, Japan

[21] Appl. No.: 411,923

[22] Filed: Mar. 28, 1995

Related U.S. Application Data

[63] Continuation of Ser. No. 280,540, Jul. 26, 1994, abandoned, which is a continuation of Ser. No. 858,716, Mar. 27, 1992, abandoned.

[30] Foreign Application Priority Data

Mar. 27, 1991 [JP] Japan ..................... 3-087789

[51] Int. Cl.⁶ ..................................... G06F 17/30
[52] U.S. Cl. ..................... 395/602; 364/DIG. 1; 364/282.1; 364/282.3; 364/283.2; 364/283.4
[58] Field of Search ............................... 395/600

[56] References Cited

U.S. PATENT DOCUMENTS

| | | | |
|---|---|---|---|
| 4,429,385 | 1/1984 | Cichelli et al. | 370/92 |
| 4,908,759 | 3/1990 | Alexander, Jr. et al. | 395/600 |
| 5,201,047 | 4/1993 | Maki et al. | 395/600 |
| 5,208,899 | 5/1993 | Wheeler et al. | 395/62 |
| 5,276,870 | 1/1994 | Shan et al. | 395/600 |
| 5,295,256 | 3/1994 | Bapat | 395/500 |
| 5,295,261 | 3/1994 | Simonetti | 395/600 |
| 5,307,484 | 4/1994 | Baker et al. | 395/600 |
| 5,379,419 | 1/1995 | Hefferman et al. | 395/600 |
| 5,386,556 | 1/1995 | Hedin et al. | 395/600 |
| 5,388,196 | 2/1995 | Pajak et al. | 395/153 |
| 5,440,730 | 8/1995 | Elmasri et al. | 395/600 |
| 5,442,784 | 8/1995 | Powers et al. | 395/600 |
| 5,471,613 | 11/1995 | Banning et al. | 395/600 |

OTHER PUBLICATIONS

Ricardo, DataBase Systems: Principles, Design, and Implementation, MacMillan 1990, pp. 470–479.

*Primary Examiner*—Wayne Amsbury
*Attorney, Agent, or Firm*—Foley & Lardner

[57] ABSTRACT

The database access system of the present invention accesses a hierarchical network type database, treating it as a relational type database. The system analyzes queries in data manipulation language for a relational database which define instructions for retrieval, update, addition and deletion conditions using query analyzing means. According to the analysis result, a record relation tree of the relation among records having the individual fields related to the operation conditions is generated by record relation combining means and stored in storing means. Further, operation conditions are resolved into sets of binary operations using retrieval, update, addition or deletion condition analyzing means so as to generate a condition tree having the operators used in the binary operations as nodes. The access module generating means generates access modules for access to a hierarchical database file based on the record relation tree and condition tree and the access executing means executes accessing based on these access modules.

12 Claims, 19 Drawing Sheets

FIG.5A

```
DEFINE   TABLE ABCDE (TABLE NAME)   ON RECORD E (BASIC RECORD NAME) ~51
         EXCEPT E2,E4,E5,······,En5 (SET NAME)   D2,D3 (FIELD NAME) ~52
         COLUMN THRU D - E                       C2,C3
         COLUMN THRU C - D                       B1,B2           ~53
         COLUMN THRU B - D                       A1,A3
         COLUMN THRU A - B                       ;
```

IMAGE OF TABLE ABCDE 54

|   | A1 | A3 | B1 | B2 | C2 | C3 | D2 | D3 | E1 | E3 |
|---|----|----|----|----|----|----|----|----|----|----|
|   |    |    |    |    |    |    |    |    |    |    |
|   |    |    |    |    |    |    |    |    |    |    |

IMAGE OF LOGICAL RECORDS FOR TABLE ABCDE 55

| A1 | A3 | B1 | B2 | C2 | C3 | D2 | D3 | E1 | E3 |
|----|----|----|----|----|----|----|----|----|----|

FIG. 8

SELECT A3 , B1 , C2 , D2 , E3 (DISPLAY COLUMN NAME) ~81

FROM ABCDE (TABLE NAME) ~82

WHERE A1 > 0 AND ⎫
((B2 < 0 AND D3 = 6) ⎬ 83
OR E1 = "A") ⎬
AND C2 = 0 ⎬
AND A3 > 100 ;RETRIEVAL CONDITION EXPRESSION

FIG.13

| RETRIEVAL OPERATION DESCRIPTION | SUCH AS CALC INDEX SCAN OWNER MEMBER | | ~121 |

AND CONDITION DESCRIPTION ~122

| FIELD NAME | BINARY OPERATION | CONDITION VALUE |
|---|---|---|
| ⋮ | | |

OR CONDITION DESCRIPTION ~123

| FIELD NAME | BINARY OPERATION | CONDITION VALUE |
|---|---|---|
| ⋮ | | |

LOGICAL RECORD OPERATION DESCRIPTION

OWNER

~124

LOGICAL RECORD CONDITION DESCRIPTION ~125

| OFFSET IN LOGICAL RECORD OF EVALUATION FIELD:1 | OFFSET IN LOGICAL RECORD OF EVALUATION FIELD:2 | "AND" OR "OR" |
|---|---|---|
| OFFSET IN NEXT EVALUATION UNIT WHEN TRUE | OFFSET IN NEXT EVALUATION UNIT WHEN FALSE | |
| ⋮ | | |

FIG. 16

UPDATE  ABCDE (TABLE NAME) ← 151

SET  E3 = E3 + 100  (UPDATE CONTENTS SPECIFIER) ← 152

WHERE  A1 > 0 AND
 ((B2 < 0 AND D3 = 6)
 OR E1 = "A")
 AND C2 = 0
 AND A3 > 100  ; RETRIEVAL CONDITION EXPRESSION

| LOGICAL RECORD OPERATION DESCRIPTION | | |
|---|---|---|
| UPDATE | | | ~161

| LOGICAL RECORD CONDITION DESCRIPTION | ~162

| OFFSET IN LOGICAL RECORD OF EVALUATION FIELD:1 | OFFSET IN LOGICAL RECORD OF EVALUATION FIELD:1 | AND /OR |
|---|---|---|
| OFFSET IN NEXT EVALUATION UNIT WHEN TRUE | OFFSET IN NEXT EVALUATION UNIT WHEN FALSE | |
| ⋮ | | |

| LOGICAL RECORD OPERATION CONTENTS DESCRIPTION | | ~163

| UPDATE FIELD NAME | UPDATE CONTENTS |
|---|---|
| ⋮ | |

FIG.18

INSERT  ABCDE (TABLE NAME) ⟋171
  VALUES  A1 = 10 , (ADDITION CONTENTS SPECIFIER)
          D3 = 20 ,  ⟍172
          E1 = "V"  ;

FIG.19

| LOGICAL RECORD OPERATION DESCRIPTION |||
|---|---|---|
| INSERT |||

— 181

| LOGICAL RECORD CONDITION DESCRIPTION ||| — 182 |

| OFFSET IN LOGICAL RECORD OF EVALUATION FIELD:1 | OFFSET IN LOGICAL RECORD OF EVALUATION FIELD:1 | AND /OR |
|---|---|---|
| OFFSET IN NEXT EVALUATION UNIT WHEN TRUE | OFFSET IN NEXT EVALUATION UNIT WHEN FALSE ||
| ⋮ |||
| LOGICAL RECORD OPERATION CONTENTS DESCRIPTION || —183 |
| ADDITION FIELD NAME | ADDITION CONTENTS ||
| ⋮ |||

DELETE <u>ABCDE</u>(TABLE NAME) ⟵ 191
    <u>VALUES A1 = 10</u> , (DELETION CONTENTS SPECIFIER)
        <u>D3 = 20</u> ; ⟶ 192
        <u>E1 = "V"</u> ;

NETWORK DATABASE ACCESS SYSTEM TO WHICH BUILDS A TABLE TREE IN RESPONSE TO A RELATIONAL QUERY

This application is a continuation of application Ser. No. 08/280,540, now abandoned, filed Jul. 26, 1994, application is a continuation of application Ser. No. 07/858,716, filed Mar. 27, 1992, now abandoned.

BACKGROUND OF THE INVENTION

1. Field of the Invention

The present invention relates to a database access system, and particularly relates to a database system where a hierarchical network database system is treated as a relational database system in accessing operations.

2. Description of the Prior Art

A database system of a hierarchical network type is capable of supporting various data structures. It is suitable for routine work and provides high processing efficiency. When developing an application program, however, the development engineer must be quite familiar with the data structure and the user interface tends to be complicated. On the other hand, a relational database system has a simple data structure. Since it expresses the data in table format, it provides a simpler user interface. It is suitable for non-routine work, but gives only low processing efficiency.

For the above reason, some systems combining the practical feature of a hierarchical network database system and the user-friendly interface of a relational database system, i.e. database systems where a hierarchical network database system is accessible with the DML (Data Manipulation Language), which is used for a relational database system, have been proposed.

Such conventional systems can be classified into three types. The first type system is provided with a pre-compiler, which allows input of a relational type DML queny and generates a DML source program of the hierarchical network type. With the second type, the relational type DML query is input to the system, which directly generates a DML object program of the hierarchical network type. For the third system, an index is given in advance to each physical record in the database files. The system is provided with a means to access the database using the indices, which is activated by input of relational type DML queny and generates an object.

With the first system described above, a DML source program of the hierarchical network type is generated from a relational type DML query. For this, it is necessary to generate another source program for condition judgment based on the execution results of the hierarchical network type DML. This means that complicated conditions for judgment, i.e. a complicated data processing request, require a complicated source program in a larger scale to be generated, which results in poor processing efficiency.

In the second system, a DML object program of the hierarchical network type is directly generated from relational type DML. However, as in the case of the first type system, the generated object program becomes larger and complicated as the data processing request becomes complicated, resulting in poor processing efficiency.

With the third system, since an index is given to each physical record in the database files, an area for index provision must be ensured separately in the database. This results in a larger capacity of the database. Further, the record access mechanism of the hierarchical network type database cannot be utilized without indices. Still another drawback of the third type system is that the embodiment is limited to a database having 1 schema, 1 range or 1 record type.

SUMMARY OF THE INVENTION

The object of this invention is to provide a database access system which realizes the practicability of a network type database and the easy operability of a relational type database by treating a network type database system as a relational type database system and enabling retrieval, update, addition and deletion.

A database access system according to a preferred embodiment of this invention to attain this object is a database access system where hierarchical database files are accessible as relational database files. The system includes input means to input a query in data manipulation language for a relational database. Also included is query analyzing means to analyze the query input at the above input means;

relation record combining means which, when the query is for table definition to define the records having the individual fields related to the data operation condition, generates a record relation tree showing the relation among records.

Data operation condition analyzing means is provided which, when the query is for a data operation request, resolves the specified data operation conditions into sets of binary operations and generates condition trees having the binary operators constituting the binary operations as nodes. Also provided is access module generating means to generate access modules showing the conditions and procedures for access to the hierarchical network type database file according to the record relation tree and condition tree input. Access module executing means analyze the access modules one by one and execute the accesses. Output means to output the execution result of the access module executing means.

According to a preferred embodiment, the database access system is provided with a record relation tree storing means to store the record relation trees generated by the relation record combining means.

According to another preferred embodiment, the data operation condition analyzing means may be a retrieval condition analyzing means which generates a condition tree based on a retrieval request query, or an update condition analyzing means which generates a condition tree based on an update request query.

Further, the data operation condition analyzing means may be an addition condition analyzing means which generates a condition tree based on an addition request query or may be deletion condition analyzing means which generates a condition tree based on a deletion request query.

A database access system according to still another preferred embodiment of this invention which treats a hierarchical database file as a relational database file in access operation includes input means to input a query in data manipulation language for a relational database and query analyzing means to analyze the query input at the above input means.

Relation record combining means are provided which, when the query is for table definition to define the records having the individual fields related to the data operation conditions, generates a record relation tree showing the relation among the records. Record relation tree storing means stores the generated record relation tree. Data operation condition analyzing means is provided which, when the query is for retrieval, update, addition or a deletion request, resolves the specified retrieval, update, addition or deletion conditions into sets of binary operations and generates condition trees having the binary operators constituting the binary operations as nodes. Also provided is access module generating means to generate access modules showing the conditions and procedures for access to the hierarchical network type database file according to the record relation tree and applicable condition tree input.

Access module executing means is provided to analyze the access modules one by one and execute the accesses. Output means output the execution result of the access module execution means.

According to a preferred embodiment, the data operation condition analyzing means comprises retrieval condition analyzing means, update condition analyzing means, addition condition analyzing means and deletion condition analyzing means.

Other objects, characteristics and effects of the present invention will be clarified in the detailed description below.

BRIEF DESCRIPTION OF THE DRAWINGS

FIGS. 5(A), 5(B), and 5(C) show the configuration of a table definition query for the database access system;

FIG. 6 is a diagram to show an example of a record relation tree of the database access system;

FIG. 8 is a diagram to show the configuration of a retrieval request query;

FIG. 13 is a diagram to show an example of an access module;

FIG. 16 is a diagram to show the configuration of an update request query;

FIG. 17 is a diagram to show an example of an access module when update is requested;

FIG. 18 is a diagram to show the configuration of an addition request query;

FIG. 19 is an example of an access module when addition is requested;

DESCRIPTION OF THE PREFERRED EMBODIMENT

Figure 1:
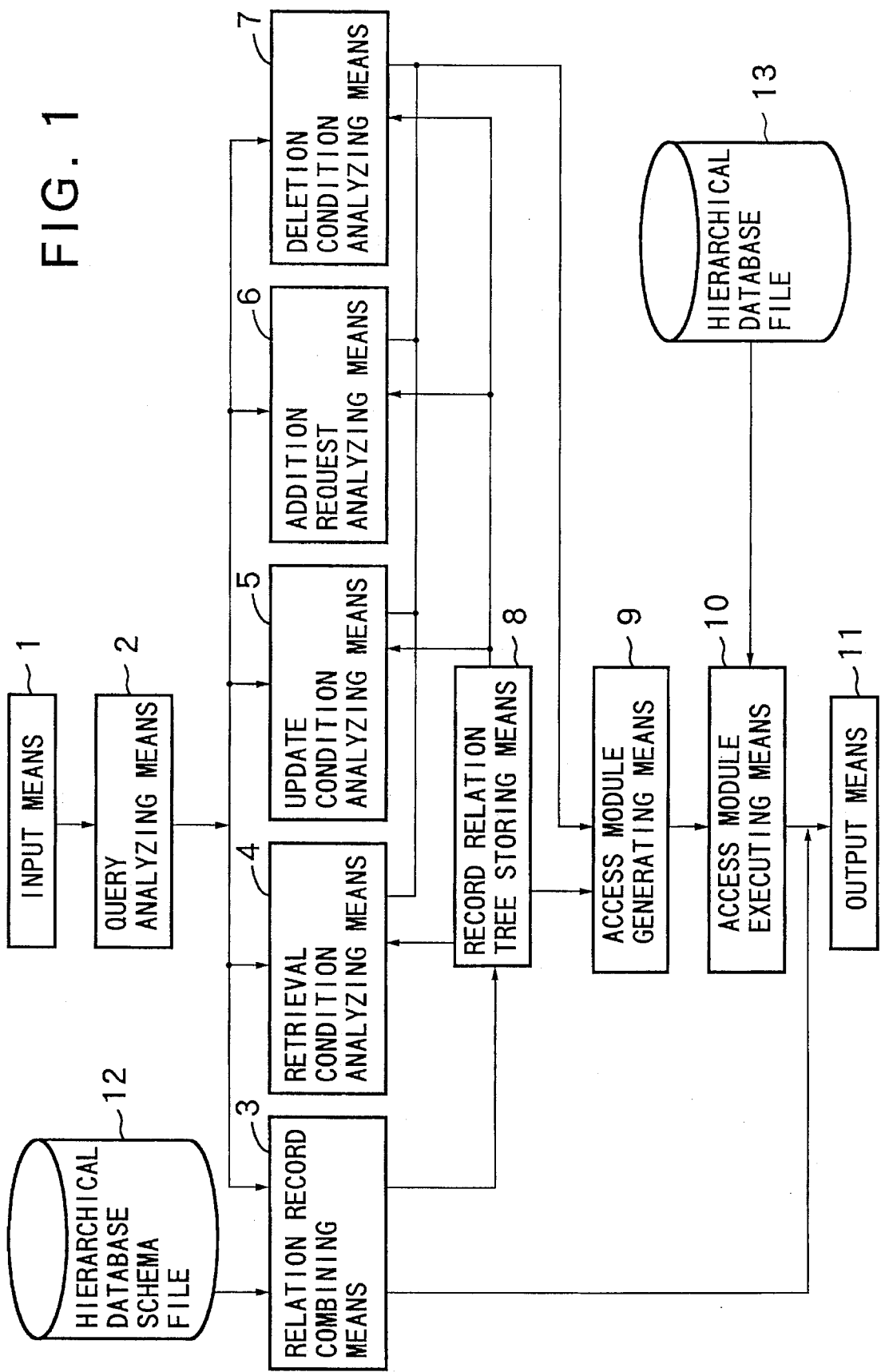
FIG. 1 is a block diagram to show the configuration of a database access system according to an embodiment of this invention.

Referring to FIGS. 1 to 21, a preferred embodiment of this invention is described below. FIG. 1 is a block diagram to show the entire configuration of a database system according to an embodiment of this invention.

In FIG. 1, a database access system of this embodiment comprises input means 1 for query input, query analyzing means 2 to analyze queries, relation record combining means 3 to generate a record relation tree according to table definition queries, retrieval condition analyzing means 4 to generate a condition tree based on the conditions specified by a retrieval request query, update condition analyzing means 5 to generate a condition tree based on the conditions specified by an update request query, addition request analyzing means 6 to generate a condition tree based on the conditions specified by an addition request query, deletion condition analyzing means 7 to generate a condition tree based on the conditions specified by a deletion request query, record relation tree storing means 8 to store a record relation tree, access module generating means 9, access module executing means 10, output means 11, hierarchical database schema file 12, and hierarchical database file 13.

A user may input to the database a query for table definition or for retrieval, update, addition or deletion request using the input means 1.

Figure 2:
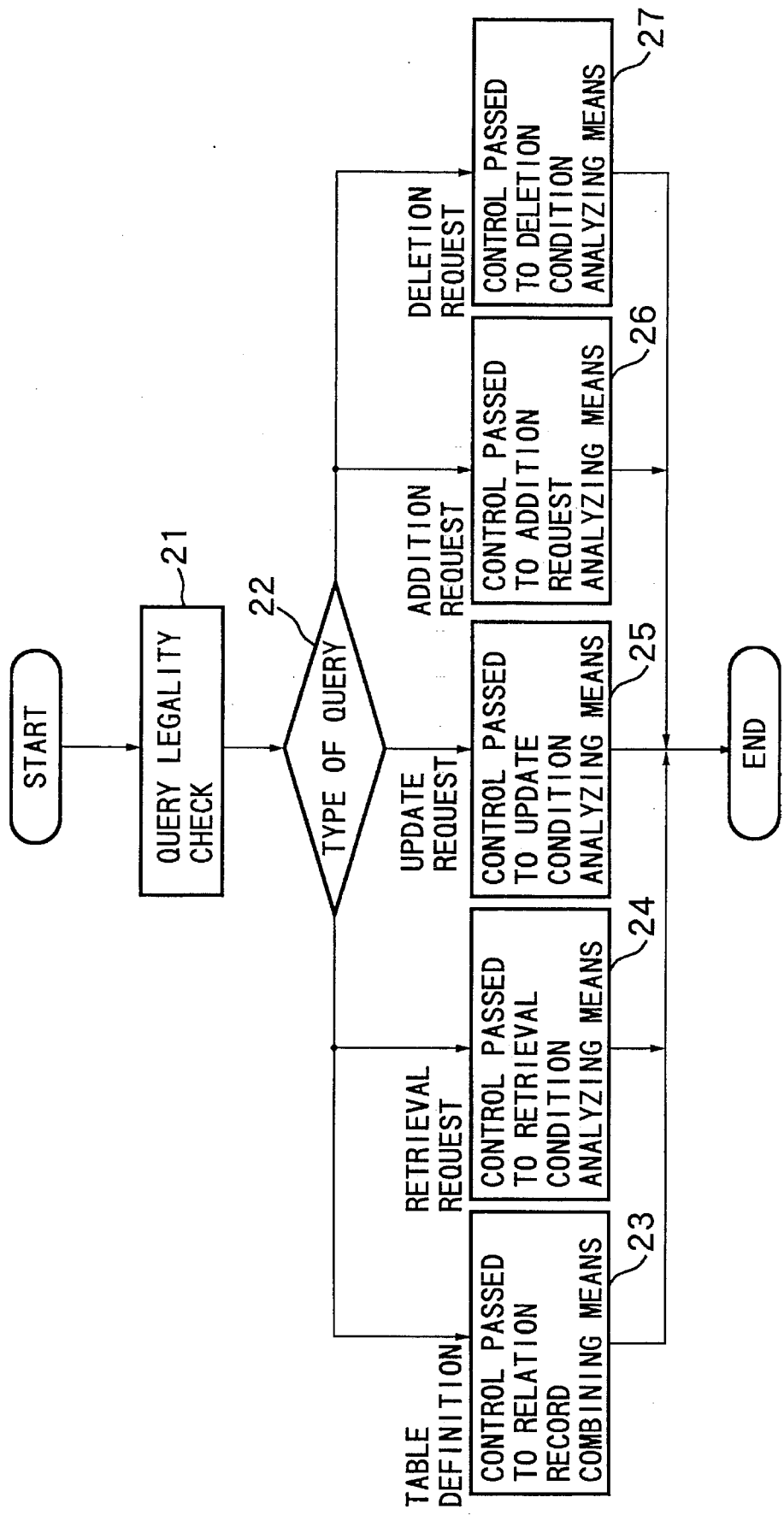
FIG. 2 is a flowchart to illustrate the processing operation by a query analyzing means of the database access system.

First of all, the user inputs a query for table definition from the input means 1 and activates the query analyzing means 2. FIG. 2 is a flowchart to show the operation of the query analyzing means 2. The query analyzing means 2 checks the legality of the input query for table definition (Step 21). If it is legal, the query analyzing means 2 sends the specified table name, the name of the basic record (the record serving as a reference of table definition, which is located at the bottom level of the hierarchical database containing the records making up the table from the viewpoint of data structure), the field names used in table columns (For unique identification of field names, fields are internally numbered. These field names are called columns in a table.) and the set name indicating the relation among records to the relation record combining means 3 (Steps 22 and 23). If the query is illegal, the error message is sent to the output mean 11, which terminates the processing.

Figure 3:
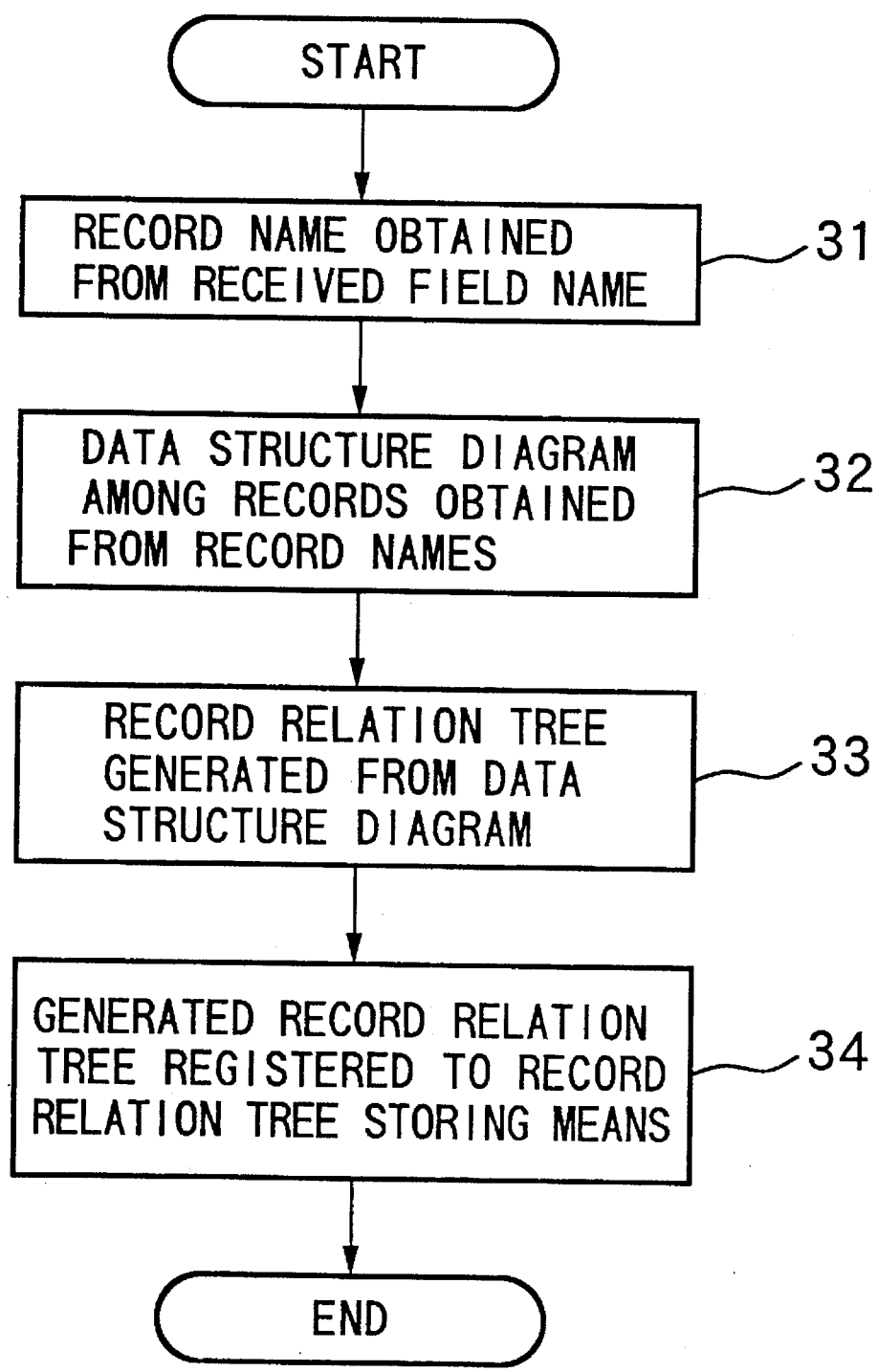
FIG. 3 is a flowchart to illustrate the processing operation by a relation record combining means of the database access system.

FIG. 3 is a flowchart to illustrate the operation of the relation record combining means 3. The relation record combining means 3 accesses the hierarchical database schema file 12 according to the field name it receives and finds out the name of the record which contains that field name (Step 31). Then, it takes out the minimum record data structure which contains all of the records it found out from the hierarchical database schema file 12 (Step 32), and expresses it as a tree structure by removing unnecessary parent-child relation while keeping the set relation (Step 33).

Here, the tree structure is generated so that the root is the basic record specified by the query for table definition and all records containing the received record names can be found by following the nodes (children) from the root to leaves and the nodes represent applicable records or records in parent-child relation with applicable records in the record data structure. If the data structure cannot be expressed as a tree, the applicable error message is sent to the output means 11, which terminates the processing.

Finally, the generated tree is registered to the record relation tree storing means 8 as a record relation tree along with the set of the table name, the field name and the set name, as well as the basic record name, logical record (virtual record containing the names of the received fields only) and record entry conditions (access means data such as DIRECT entry, CALC entry and INDEX entry) in the record relation tree (Step 34) and the message to that effect is sent to the output means 11.

Figure 4:
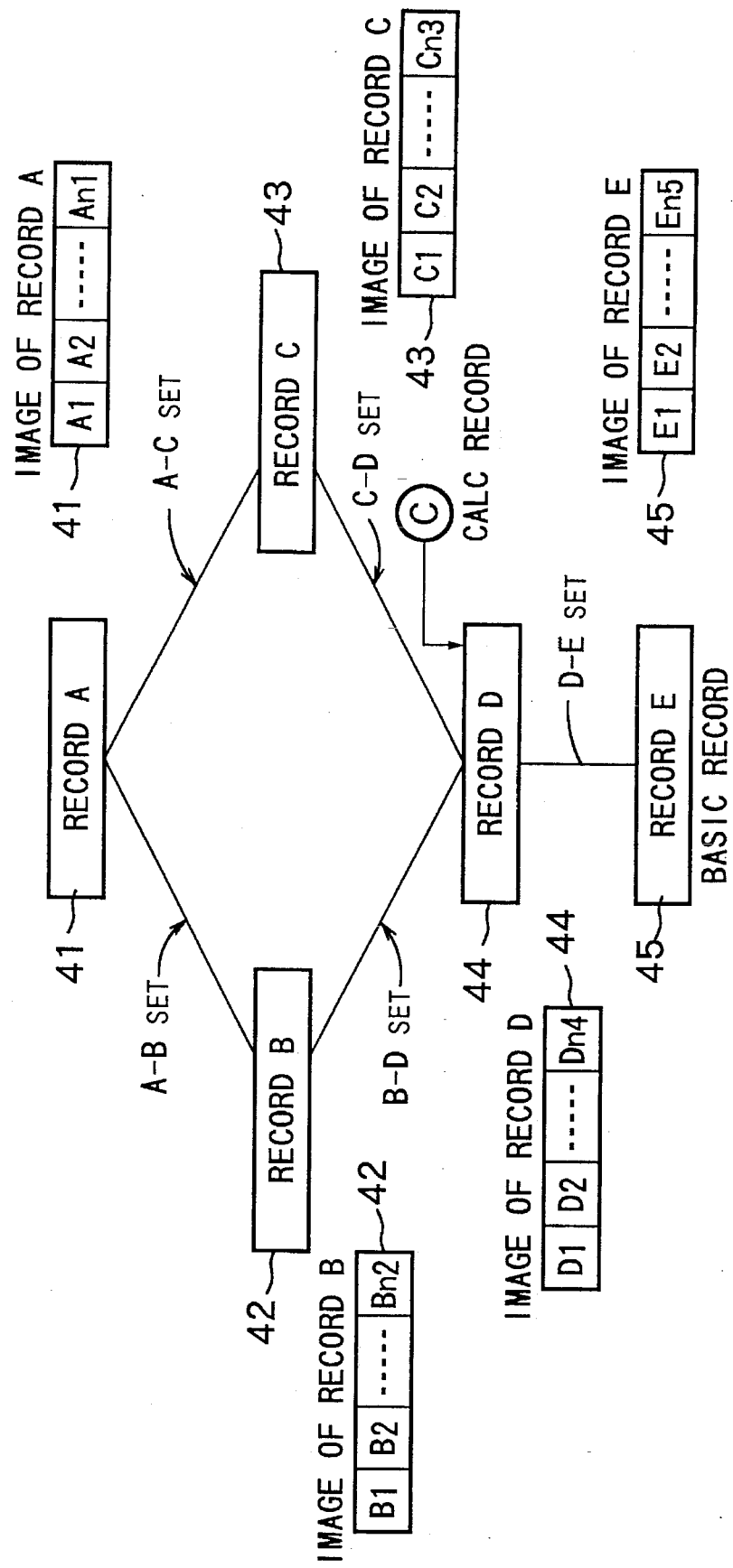
FIG. 4 is a diagram to show a specific example of the data structure in a hierarchical network type database.
Figures 5B, 5C, 6:
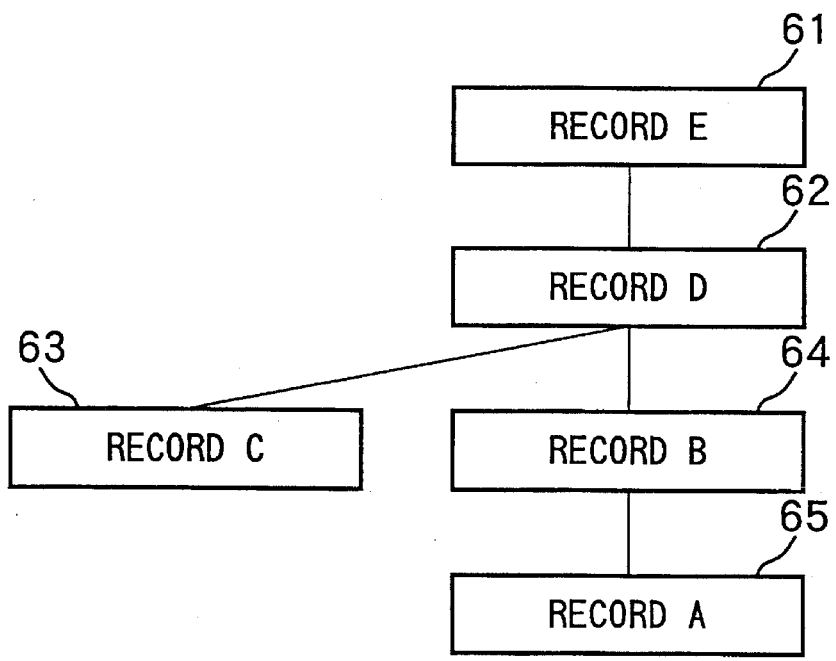

The above procedure is now described according to a specific example. FIG. 4 shows a specific example of a data structure defined in a hierarchical network database. In FIG. 4, Record A 41, Record B 42, Record C 43, Record D 44 and Record E 45 exist in a single schema, which has a data structure as shown in the figure. FIGS. 5(A), 5(B) and 5(C) show a specific example of a query for table definition input from the input means 1. In FIG. 5 (A), the table definition query consists of a table name specifier 51, an unnecessary field specifier 52 to specify the fields not required in the basic record, and necessary field specifiers 53 to specify the names of the fields to be used in the basic record. The table defined in this specific example virtually has a table image 54 with the structure as shown in FIG. 5 (B) and has a logical record with the logical record image 55 as shown in FIG. 5 (C).

FIG. 6 shows a specific example of a record relation tree generated by the relation record combining means 3. When the query for table definition shown in FIG. 5 (A) is processed by the query analyzing means 2, "ABCDE" as the table name, "Record E" as the basic record name, "E1, E3, D2, D3, C2, C3, B1, B2, A1, A3" as the field names, "D–E, C–D, B–D, A–B" as the set names are sent to the relation record combining means 3.

The relation record combining means 3 takes out the data structure as shown in FIG. 4 from the hierarchical database schema file 12 and generates a record relation tree as shown in FIG. 6. In addition to the table name "ABCDE", the basic record name "Record E", the field names "E1, E3, D2, D3, C2, C3, B1, B2, A1, A3" and the set names "D–E, C–D, B–D, A–B", the logical record image 55 as the logical record corresponding to this table and the CALC entry data as the entry conditions for Record D are registered to the record relation tree storing means 8.

Here, in FIG. 6, the record relation tree has the basic record specified by the table name specifier 51 (Record E in the specific example) as the root and records having the fields specified by the necessary field specifiers 53 as nodes or leaves. The records are related with keeping the parent-child relation (set relation) shown as the data structure in FIG. 4 and combined according to the set names specified by the necessary field specifiers 53.

Then, the user inputs a query for retrieval, update, addition or deletion request from the input means 1 and activates the query analyzing means 2. Referring to FIG. 2, the query analyzing means 2 checks the legality of the input query for retrieval, update, addition or deletion request (Legality of table name and column name as well as syntax legality are checked by referring to the record relation tree 8) (Step 21). If the query is legal, the query analyzing means 2 sends the specified table name and display column name and the conditional expressions for retrieval, update, addition or deletion to the retrieval condition analyzing means 4, the update condition analyzing means 5, the addition condition analyzing means 6 or the deletion condition analyzing means 7 according to the type of the query (Steps 22, 24, 25, 26 or 27). If the query is illegal, the error message is sent to the output means 11.

The retrieval condition analyzing means 4 resolves the received retrieval condition expression into binary operations to generate a condition tree. In this embodiment, "AND", "OR", "=", "NOT=", ">", "<", ">=" and "<=" are used as binary operators.

Figure 7:
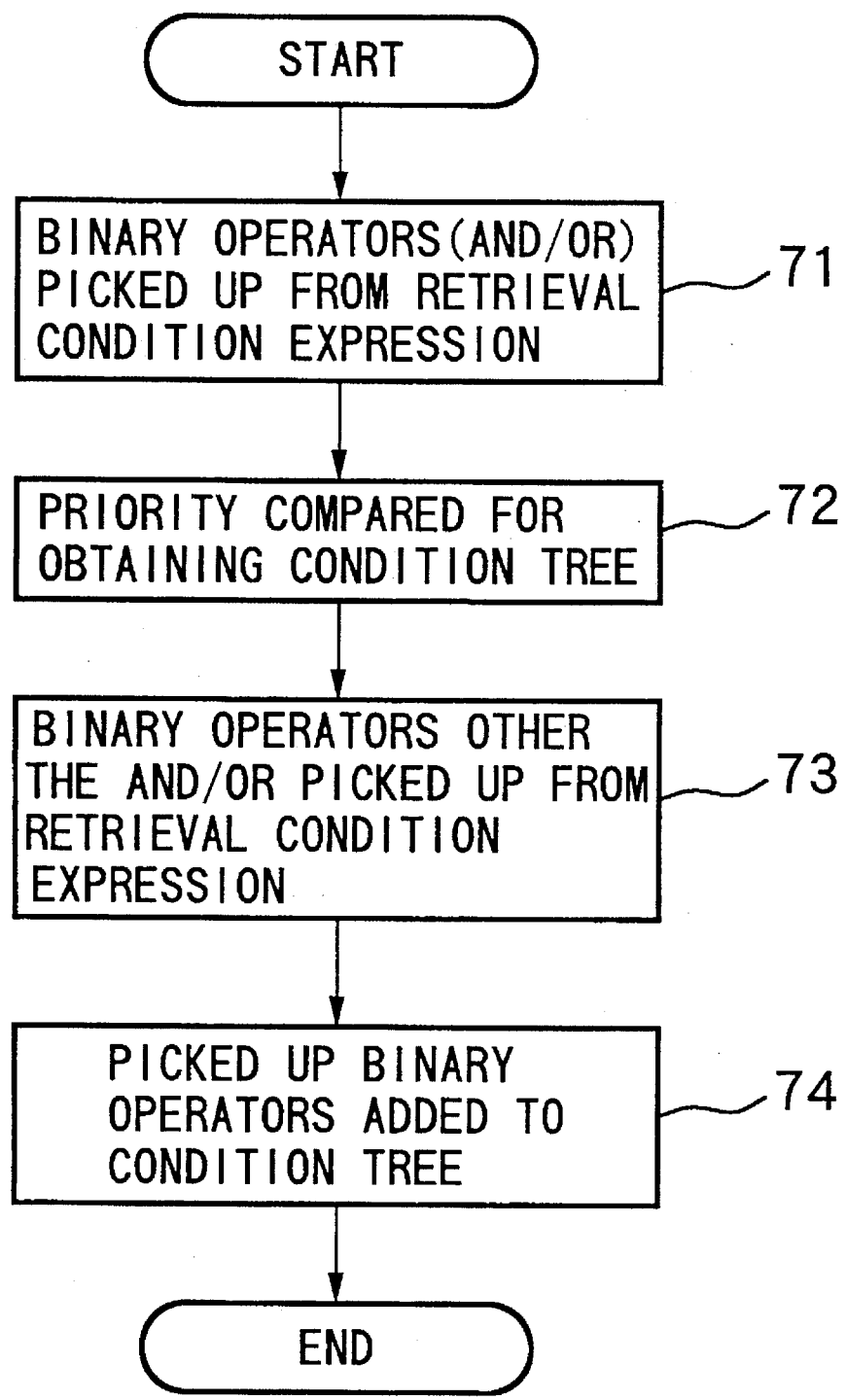
FIG. 7 is a flowchart to illustrate the processing operation by a retrieval condition analyzing means of the database access system.

FIG. 7 is a flowchart to show the processing at the retrieval condition analyzing means 4. In FIG. 7, the received retrieval condition expression is scanned from the left to the right to find out "AND" and "OR" among binary operators (Step 71). Then, the priority is checked according to the evaluation of "AND"s and "OR"s found out. An operator with a higher priority is arranged to a higher level. The conditions of the operators are checked from higher level operators. The evaluation is continued with passing the evaluation result to an operator at the next level and the conditional expression is represented by a tree structure (condition tree) so that the received retrieval condition expression can be entirely evaluated (Step 72). If two or more "AND"s or "OR"s have the same priority, they are put into a single node. If there is not any "AND" nor "OR" at a level, then give a virtual "AND" there.

Then the received retrieval condition expression is scanned again from the left to the right to find out binary operators other than "AND" and "OR" i.e. "=", "NOT=", ">", "<", ">=" and "<=" (Step 73). Both sides of the binary operators are taken out. These binary operators have their root labels found out. A partial tree where the root has two children without any grandchild (child of child) is now generated with the left child label being a field name with specified conditions and the right child label being a specified constant. This partial tree is added under a node of the above condition tree ("AND" or "OR" to evaluate the comparison result) (Step 74). When scanning of the retrieval condition expression is terminated, the generated condition tree, the display column name and the table name are sent to the access module generating means 9.

The above procedure is now described more specifically. FIG. 8 shows a specific example of a query for retrieval request in data manipulating language for a relational database. In FIG. 8, the query for retrieval request comprises a display column name specifier 81, a table name specifier 82 and retrieval condition specifiers 83.

Figure 9:
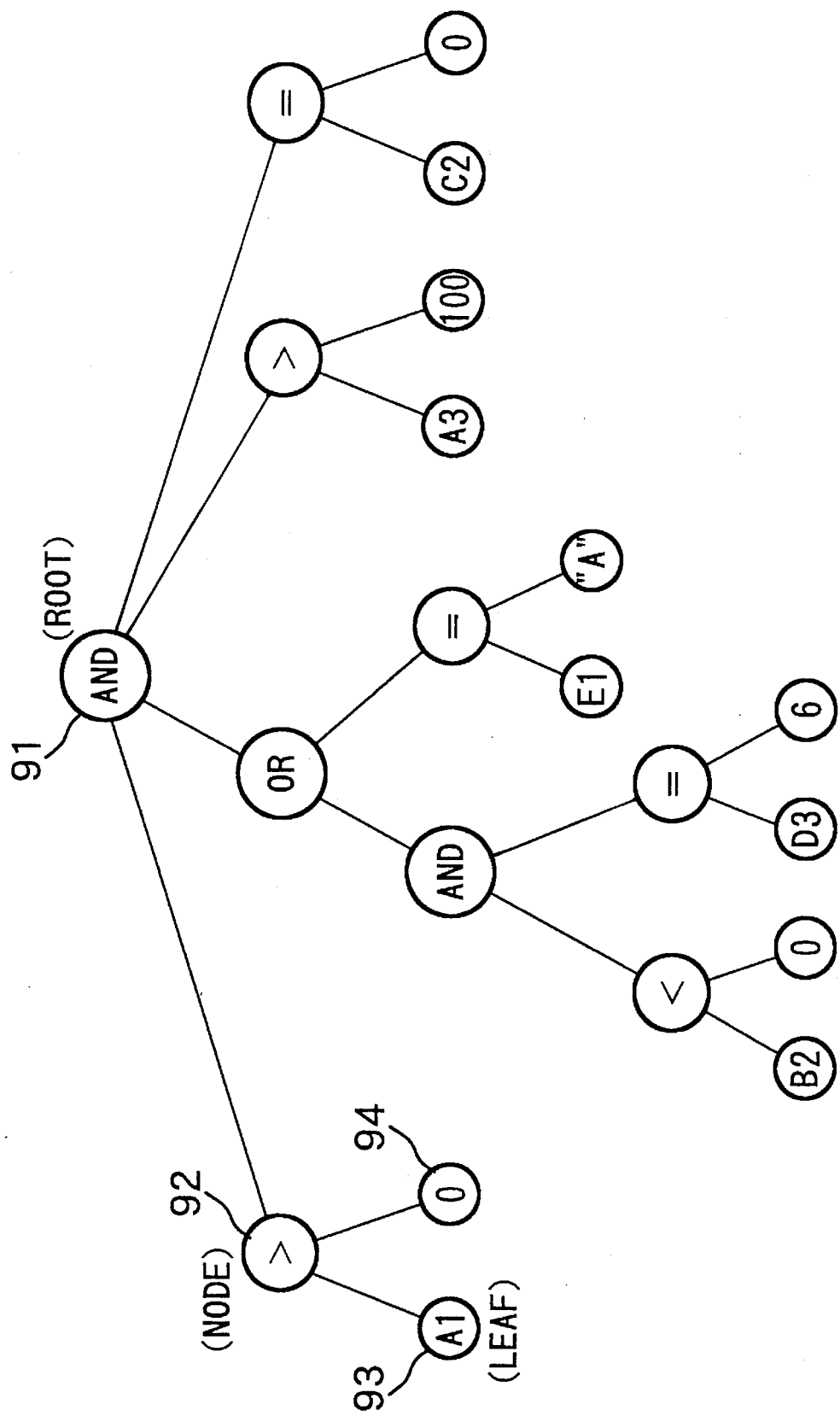
FIG. 9 is a diagram to show an example of a condition tree.

FIG. 9 shows a specific example of a condition tree generated as a result of processing at the retrieval condition analyzing means 4. In FIG. 9, the condition tree comprises a root 91 of the condition tree, a node 92 whose label is a binary operator and which always has a child or children, a node (leaf) 93 whose label is a field name and which does not have any child, and a node 94 whose label is a constant specified by the retrieval condition specifier 83 and which does not have any child.

When the query for retrieval request shown in FIG. 8 is processed by the query analyzing means 2, the table name "ABCDE", the display column names "A3, B1, C2, D2, E3" and retrieval condition expression "A1>0 AND ((B2<0 AND D3=6) OR E1="A") AND C2=0 AND A3>100" are sent to the retrieval condition analyzing means 4. The retrieval condition analyzing means 4 scans the received retrieval condition expression as described above to generate a condition tree. Here, the generated condition tree is sent to the access module generating means 9 along with the table name "ABCDE" and the display column names "A3, B1, C2, D2, E3".

Figure 10:
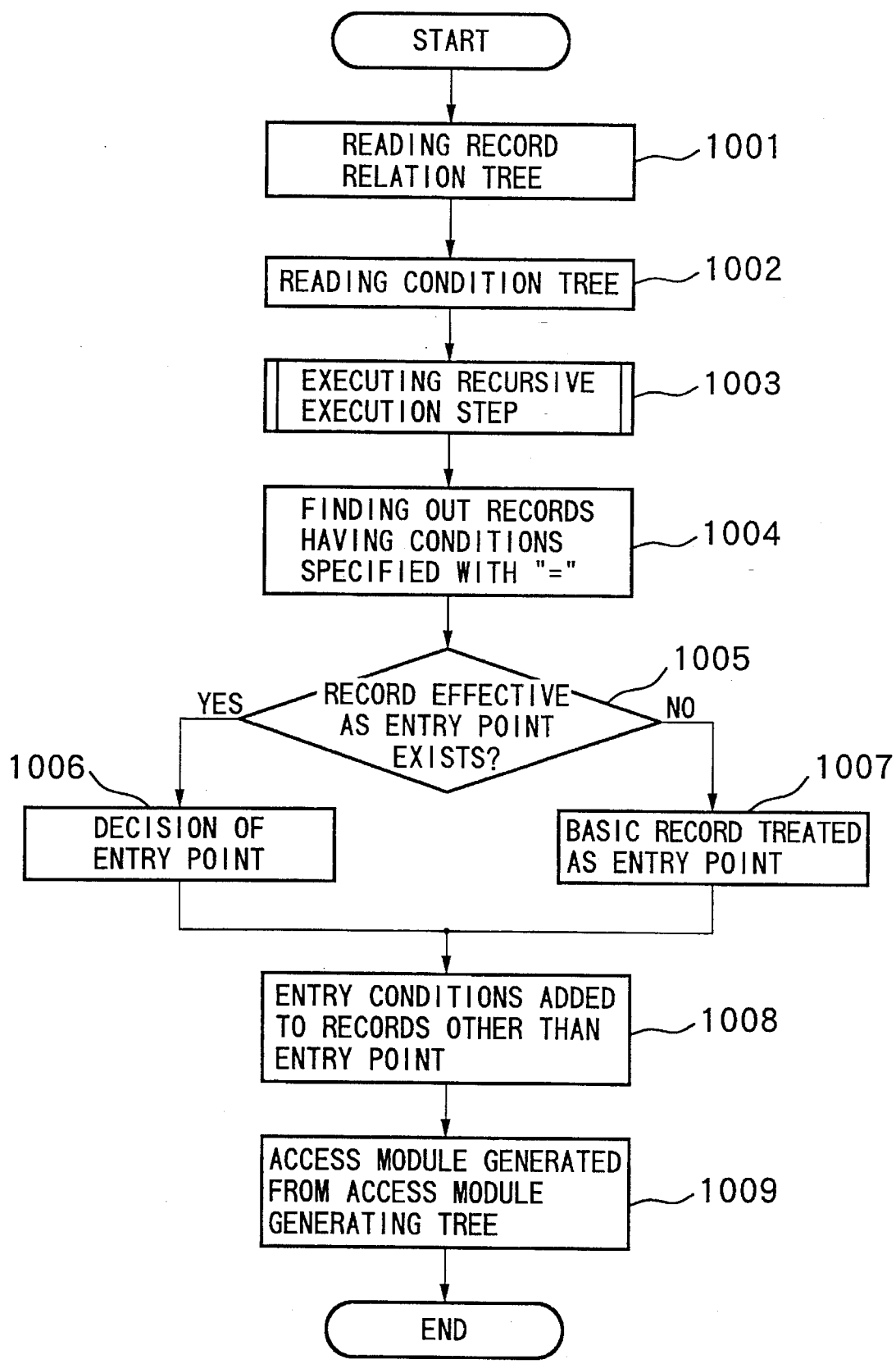
FIG. 10 is a flowchart to show the processing operation by the access module generating means of the database system.
Figure 11:
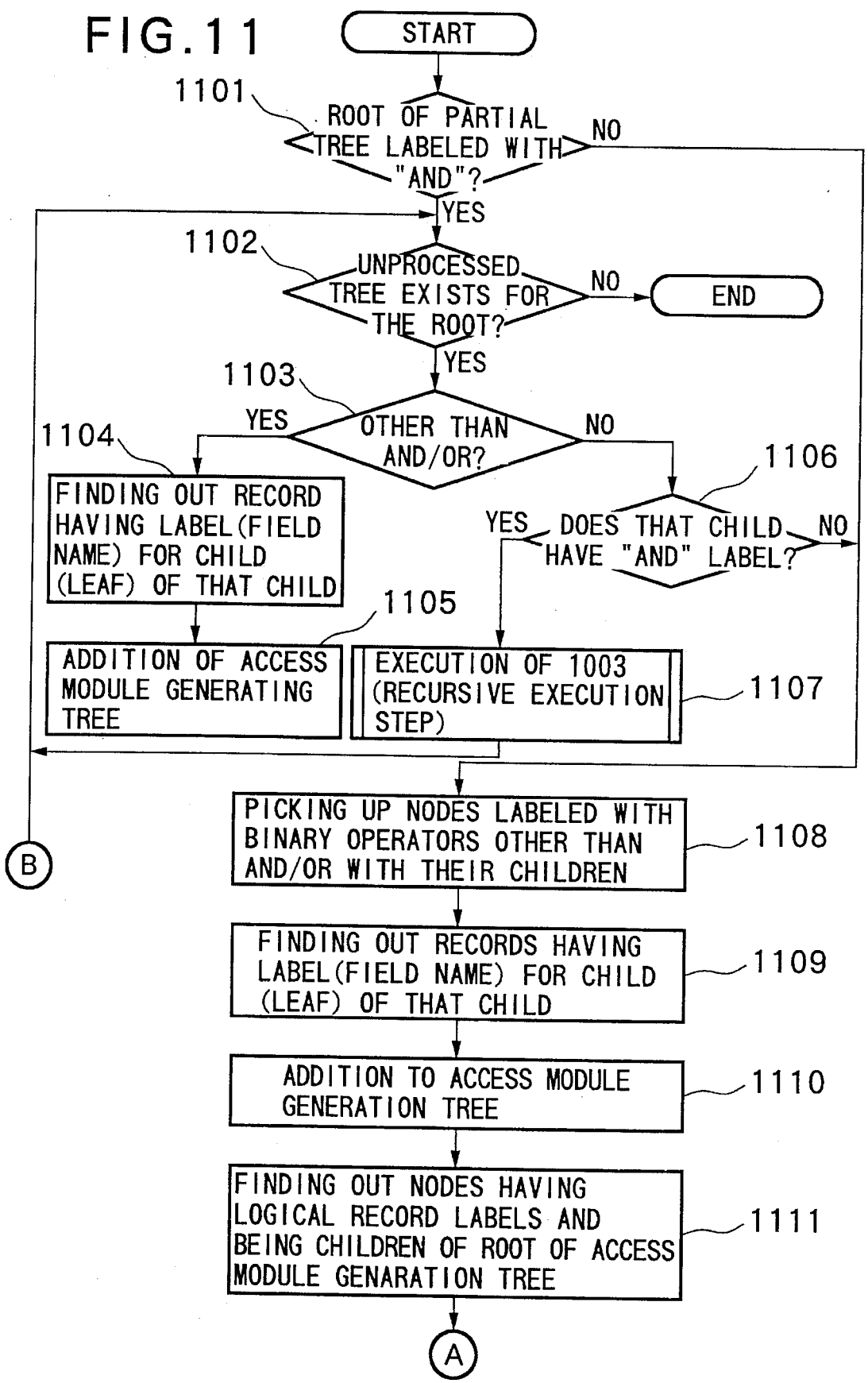
FIG. 11 is a flowchart to illustrate the processing in a recurve execution step at the access module generating means.
Figure 12:
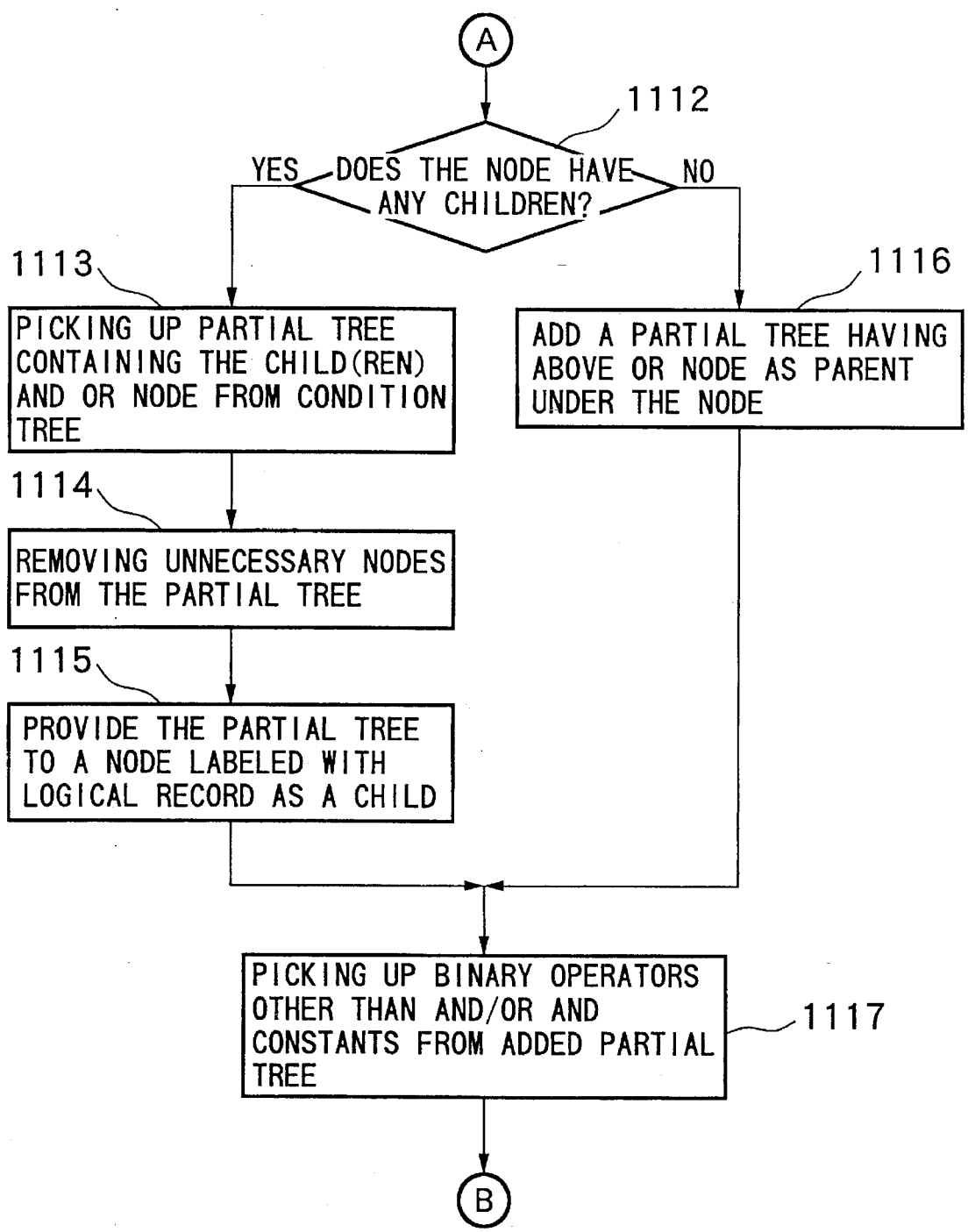
FIG. 12 is a continuation of the above flowchart to illustrate the processing in a recursive execution step at the access module generating means.

FIG. 10 is a flowchart to illustrate the processing by the access module generating means 9. FIGS. 11 and 12 show a flowchart to illustrate the operation of a recursive execution step 1003. FIG. 13 shows an example of an access module generated by the access module generating means 9. This access module comprises retrieval scanning description 121, AND condition description 122, OR condition description 123, logical record operation description 124 and logical record condition description 125.

In FIG. 10, the access module generating means 9 accesses the record relation tree storing means 8 according to the table name it has received. Then, it reads the record relation tree corresponding to that table to obtain an access module generation tree (the tree serving as the base of access modules) (Step 1001). Next, the access module generating means 9 reads the condition tree received from the retrieval condition analyzing means, treats the whole condition tree as a partial tree (Step 1002), and calls the recursive execution step 1003 using it as an argument.

In the recursive execution step 1003, the root of the partial tree in the condition tree is checked to see if its label is "AND" (Step 1101). If the root label is "AND", then whether the root has any unprocessed children is checked (check the children of partial tree roots from the left) (Step 1102). Step 1103 is executed if such a root child exists, but if such a root child does not exist, then the system returns to the previous state of the recursive execution step 1003.

Next, it is checked whether the unprocessed child of the root has a label of binary operator other than "AND" and "OR" (Step 1103). Step 1104 is executed for a binary operator other than "AND" and "OR", and Step 1106 is executed for "AND" and "OR" binary operators.

When the label is a binary operator other than AND or OR, the access module generation tree is searched for a node corresponding to a record having a label for a child of the unprocessed child of the root (grandchild of the root) (Since the child has a label of a binary operator other than AND or, the left grandchild label is the field name with specified conditions and the right grandchild label is the specified constant) (Step 1104).

Next, the nodes of the access module generation tree are checked to see if there is any child having a label of "conditional AND". If not, such a child is newly added and a partial tree having a binary operator in the condition tree currently processed (Partial tree having as parent the child of the partial tree root in the condition tree currently processed) is added thereunder (Step 1105).

Then, the procedure from Step 1102 is executed again. If the unprocessed child of the root is labeled "AND" or "OR" in Step 1103, it is checked whether the child of the partial tree root is "AND" or not (Step 1106). If it is "AND", the recursive execution step 1003 is called again using a partial tree having as parent the child of another partial tree in the condition tree currently processed as an argument (Step 1107) and Step 1102 is executed after returning from Step 1003.

When the label for the child of the root in the partial tree currently processed is not "AND" and when the label for the child of the partial tree root is not "AND", the partial tree having the condition tree node in question as parent is scanned so as to pick up all partial trees having labels of binary operators other than "AND" and "OR" (Step 1108). For every partial tree picked up, the access module generation tree is searched for a node corresponding to the record having the label (field name) for the child of that root (Step 1109).

Then, it is checked whether the nodes of the access module generation tree found out have any children labeled "OR". If there is not such a child, a child is newly added and a partial tree picked up as described above is given thereunder (Step 1110).

After giving all partial trees picked up, it is checked whether any root in the access module generation tree has a child having a label of "logical record". If there is not such a child, then a child having a label of "logical record" is added to the left end of the root for the access module generation tree (Step 1111).

Next, it is checked whether the above child node labeled "logical record" has any children or not (Step 1112). If there is not any child, a partial tree of the condition tree in question having the node labeled "OR" as parent thereunder is added (Step 1116) to cause Step 1117.

If there is such a child, supposing that the level in the condition tree corresponding to the child of the above node labeled "logical record" to be n and the level in the condition tree corresponding to the node labeled "OR" in the partial tree in question to be m, a partial tree having as parent a node at the level k in the condition tree and containing the above two nodes are searched for, where k=n−1 when n<m, k=n−1 when n=m, and k=m−1 when n>m. If such a tree is not found immediately, the procedure is repeated until such a partial tree is found out with supposing k=k−1 (Step 1113).

Further, for parent-child relation in the tree structure from the parent of the partial tree found out to the above two nodes, a partial tree whose children are reduced to one is generated (Step 1114) and is added under the node having the label of "logical record" or replaces the already existing record (Step 1115).

Finally, nodes having labels of binary operators other than "AND" and "OR" and those having constants specified by the retrieval condition expression as labels are removed from the above partial tree after addition or replacement (Step 1117) and the procedure is repeated from Step 1102. When execution of the recursive execution step 1003 is totally completed, then the Step 1004 is executed.

The completed access module generation tree is scanned first to search for a node having a label of record name and a child labeled "AND", and, among children of the above child (grandchildren of the node having a label of record name), a child labeled "=" (record name) (Step 1004).

In the next step, entry conditions for records found out from the record relation tree storing means 8 are retrieved and records having entry conditions effective for access such as CALC, INDEX and DIRECT are listed (Step 1005). The node (record) at the lowest level (within the access module generation tree) is treated as the entry point (starting point of the access module). A child labeled "operation" is added to the above node and then a node having a label of entry condition is added thereunder (Step 1006).

When such a node does not exist, the root of the access module generation tree (the node corresponding to the basic record) is used as the entry point. A child labelled "operation is added to this node and a node labeled "SCAN" (all over scanning), which is the entry condition, is added thereunder (Step 1007).

Then, for nodes corresponding to other records which are not used as the entry point in the access module generation tree (including the nodes labeled "logical record"), the parent-child relation in tree structure is traced starting from the entry point. A child labeled "operation" along with a node having a label of entry condition "OWNER" thereunder is added to nodes at higher levels, and a node labeled "operation" along with a node having a label of entry condition "MEMBER" thereunder is added to nodes at lower levels (Step 1008). When all the nodes corresponding to the records in the access module generation tree have been scanned, access modules are completed.

Finally, starting from the entry point, the completed access module generation tree is scanned from the right according to the level priority (when two or more children exist, the child of that child is processed before proceeding to the next child) with focusing on the nodes having record names as levels (Step 1009).

FIG. 13 shows an example of an access module. Referring to FIG. 13, the access module comprises retrieval operation description 121, AND condition description 122, OR condition description 123, logical record operation description 124 and logical record condition description 125.

In Step 1009 of FIG. 10, the child of the child labeled "operation" is copied to the retrieval operation description 121 in the access module. If the conditions in AND condition description 122 are not satisfied here, the access module to be next executed is the previous one for a record whose entry condition is "OWNER" and the module itself for a record whose condition is "MEMBER". Such instructions are also copied to the retrieval operation description 121.

In this Step, the child of the child labeled "conditional AND" is copied to the AND condition description 122 of the access module, and the child of the child labeled "conditional OR" is copied to the OR condition description 123. If there is a node having a record name label "logical record", the child of the child labeled "operation" is copied to the logical record operation description 124 of the access module and a partial tree having another child as parent to the logical record condition description 125.

By laying the access modules in the order of their scanning, the order of access modules for access to the hierarchical database file 13 is obtained. This order is sent to the access module executing means 10.

Figure 14:
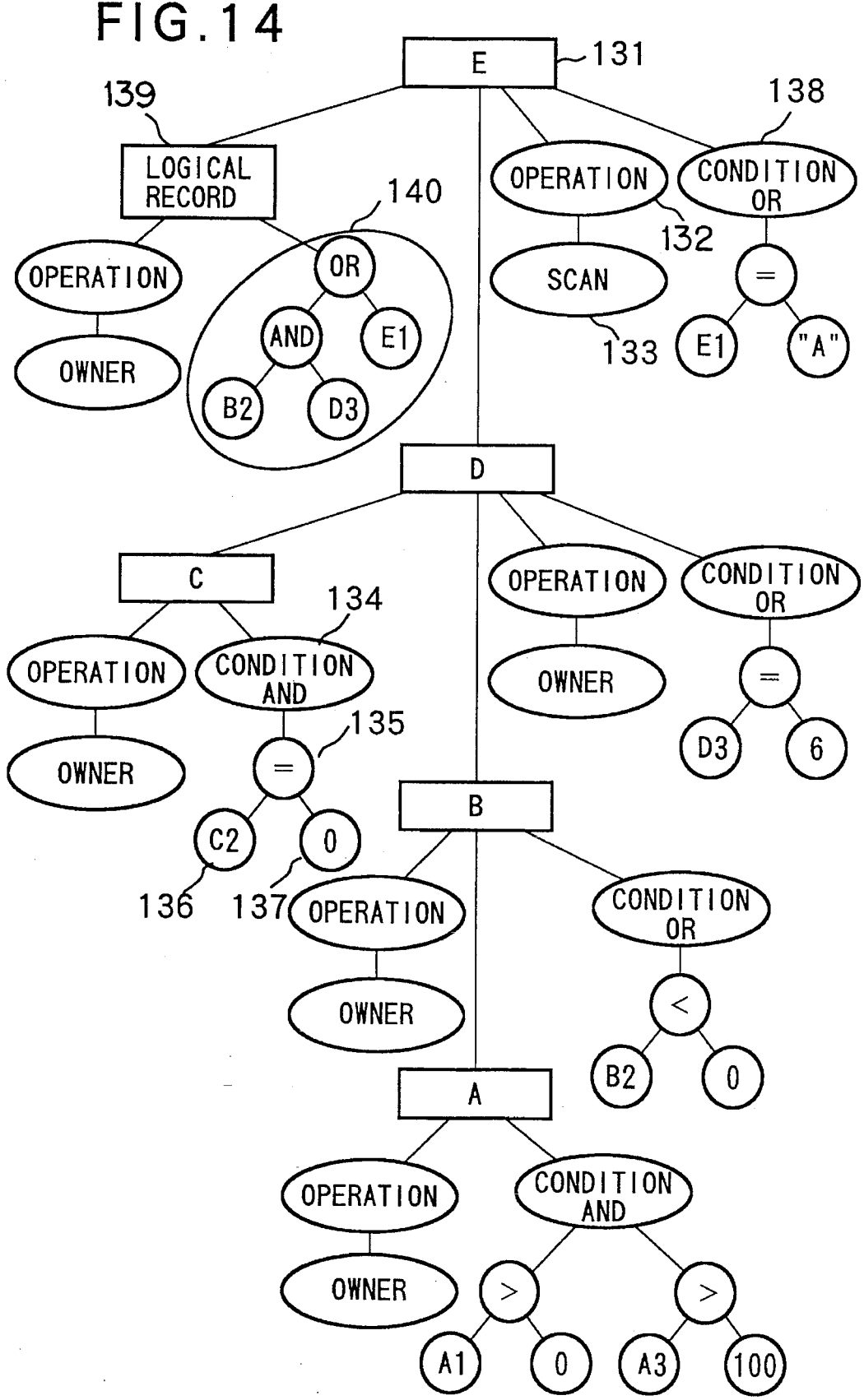
FIG. 14 is a diagram to show an example of an access module generation tree.

Processing at the access module generating means 9 is described in detail according to a specific example of an access module generation tree as shown in FIG. 14. The access module generation tree first comprises nodes 131 with record name labels (A, B, C and D) only (Step 1001). Then, from the condition tree as shown in FIG. 9, a node labeled "conditional AND" 134, a node having a label of a binary operator other than "AND" and "OR" which always has a child 135, a node having a field name label which does not have any child 136 and a node having a label of a constant specified by the retrieval condition specifier 83 which does not have any child 137 are added under the node corresponding to Record C (Steps 1104 and 1105).

Similarly, under the node corresponding to Record A, a partial tree having a node labeled "conditional AND" is added as parent (Steps 1104 and 1105). The partial tree having "OR" as parent in the condition tree of FIG. 9 is added under the nodes corresponding to Records E, D and B along with the node labeled "condition OR" (Steps 1108, 1109 and 1110). Further, a node having "logical record" label 139 is added under the root (1111) and a partial tree 140 is also added thereunder. From the partial tree 140, binary operators other than "AND" and "OR" and constants have been removed (Steps 1112, 1116 and 1117).

In this case, Record D is a CALC record and has a retrieval condition specifier 83 with specification of condition "=" (Step 1004). However, this condition is contained in the partial tree having "OR" as parent in the condition tree of FIG. 9 and Record D cannot be an effective entry point (Step 1005). Accordingly, Record E, which is a basic record, is selected as the entry point, and a node having "operation" label 132 and a node having retrieval condition label "SCAN" 133 are added to it (Step 1007). Now that Record E is taken as the reference, "OWNER" is added to all other records as the entry condition (Step 1008). The access module executing means 10 executes a series of access modules received from the access module generating means.

Figure 15:
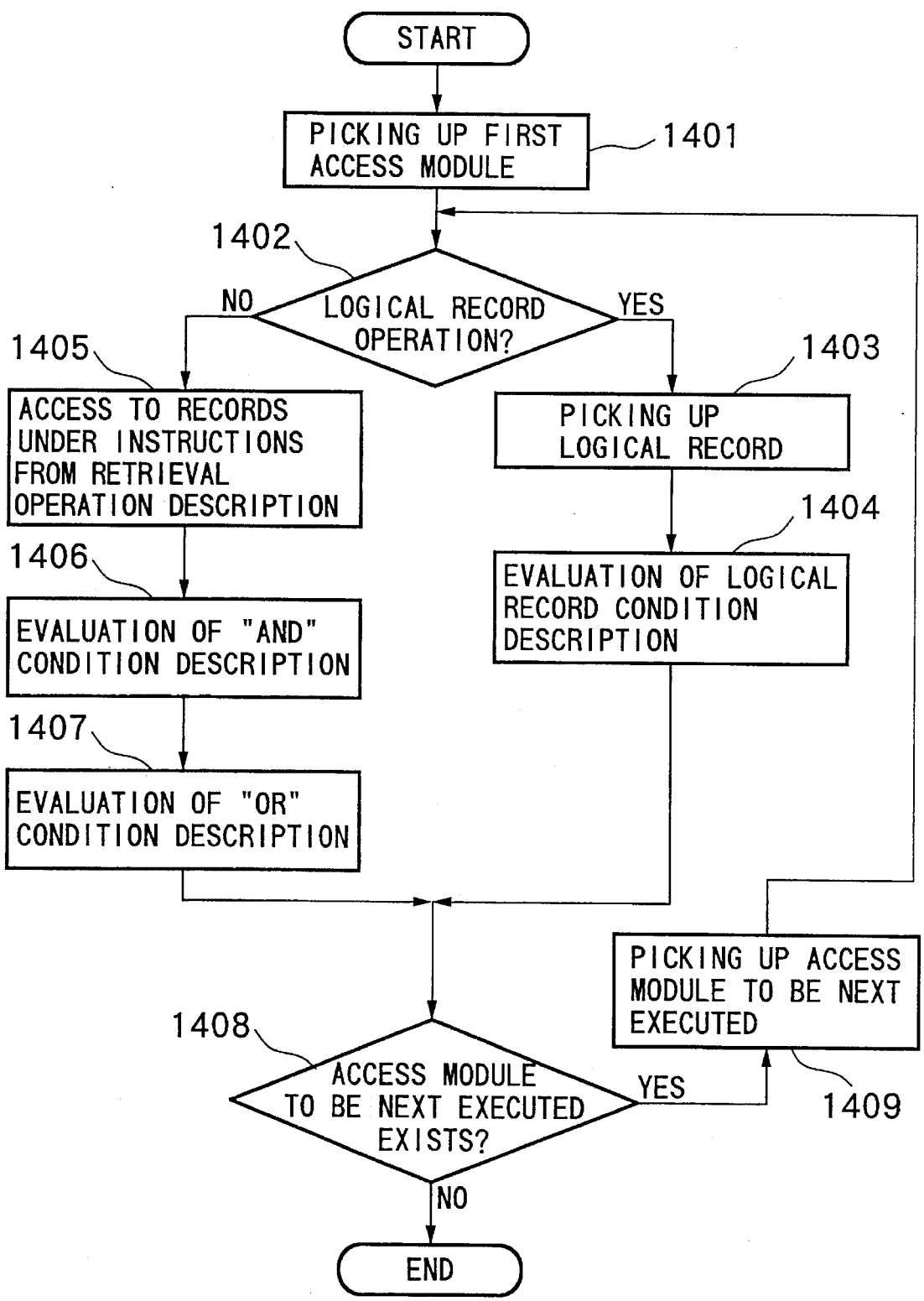
FIG. 15 is a flowchart to illustrate the processing operation by the access module executing means.

FIG. 15 is a flowchart to illustrate the processing of the access module executing means 10. In FIG. 15, the access module executing means 10 accesses to a record according to the retrieval condition description 121 (Step 1405) and evaluates the conditions in AND condition description 122 and OR condition description 123 (Steps 1406 and 1407) for the fields in the accessed record.

The evaluation results for conditions in OR condition description 123 are written to the logical record (Step 1407, 1403) and evaluated at the logical record condition description 125 (Step 1404).

When execution of all the received access modules is completed (Step 1408), a logical record satisfying the conditions in the retrieval request query is obtained. In practice, if instructions are given so that the current database key values are output to the retrieval operation description 121, the current database key values are internally stored and a set of database keys for the basic record is obtained. Finally, the number of records and other necessary data are sent to the output means 11.

If the user wants to have the contents of the retrieved records displayed, then the user inputs a query for record image display from the input means 1. The operation after this is almost the same as the retrieval processing described above. Since the database key values of the logical record (basic record) are already obtained, however, the most effective entry condition "DIRECT" can be applied as the entry condition. The basic record is used as the entry point of the access module generation tree and the node added under the child labeled "operation" has entry condition "DIRECT" as the level. The node corresponding to other record and added under the child labeled "operation" is generated so as to have the label of entry condition "OWNER".

Since there is no need of condition evaluation here, nodes having labels of "conditional AND", "conditional OR" and "logical record" are not generated. After the access modules thus generated are executed module by module and the display field is accessed, a logical record image can be obtained by output of the contents to UWA etc.

Retrieval operation has been described above. The system similarly operates for other access conditions such as update, addition and deletion.

Now the procedures of update, addition and deletion are described focusing on the difference from the retrieval processing.

FIG. 16 shows a specific example of update request query in data manipulation language for a relational database. The update request query comprises a table name specifier 151, an update contents specifier 152 and a retrieval condition expression 153. FIG. 17 gives an access module generated by the access module generating means 9 when update is requested, which is a specific example showing difference from retrieval processing. This access module comprises logical record operation description 161, logical record condition description 162 and logical record operation contents description 163.

When the user inputs an update request query from the input means 1, the query analyzing means 2 checks whether the update request query input is legal (Step 21), and, if so, sends the specified table name, the update column (field) name, the update contents and the retrieval condition expression to the update condition analyzing means 5 (Steps 22 and 25). If not, the error message is output to the output means 11.

The update condition analyzing means 5, like the retrieval condition analyzing means 4, generates a condition tree based on the retrieval condition expression and sends the condition tree with the table name, the update column (field) name and the update contents to the access module generating means 9.

The access module generating means 9 generates an access module as with a retrieval request, but logical record operation contents description 163, which describes the update contents, is added in logical record operation as shown in FIG. 17 (Step 1009).

The access module executing means 10 executes the access modules one by one as in the case of a retrieval request, but in the logical record operation, the record column which satisfies the retrieval condition expression is updated. Here, other columns (columns not registered to the logical record as table or those registered to the logical record as table but not specified by the update contents specifier 152) of the same record are not updated.

FIG. 18 shows a specific example of addition request query in data manipulation language for a relational database. This addition request query comprises a table name specifier 171 and an addition contents specifier 172. FIG. 19 gives an access module generated by the access module generating means 9 when addition is requested, which is a specific example showing the difference from the retrieval processing. The access module comprises logical record operation description 181, logical record condition description 182 and logical record operation contents description 183.

When the user inputs an addition request query from the input means 1, the query analyzing means 2 checks whether the addition request query input is legal (Step 21) and, if so, sends the specified table name, the update column (field) name and the addition contents to the addition condition analyzing means 5 (Steps 22 and 26). If not, the error message is output to the output means 11. In this embodiment, a column in the basic record is always specified as the addition contents specifier 172.

The addition request analyzing means 6, like the retrieval condition analyzing means 4, generates a condition tree deeming the addition contents as a retrieval condition expression and sends the condition tree with the table name, the addition column (field) name and the addition contents to the access module generating means 9.

The access module generating means 9 generates an access module as with a retrieval request, but logical record operation contents description 183, which describes the addition contents, is added in logical record operation as shown in FIG. 19 (Step 1009).

The access module executing means 10 executes the access modules one by one as in the case of a retrieval request, but in the logical record operation, it is checked whether any basic record satisfies all addition contents specified by the addition contents specifier 172. If such a record exists, that basic record with the addition contents is added to basic records.

Here, NULL (unfixed value) is set to other columns (columns not registered to the logical record as table or those registered to the logical record as table but not specified by the addition contents specifier 172) of the basic record. If such a record does not exist, records which are ancestors (records found when tracing back the tree) of the basic record in the data structure and which are the closest to the basic record (appearing earlier when tracing back) are searched for a record having a column satisfying the addition contents specified by the addition contents specifier 172. This record having a column satisfying the addition contents specified by the addition contents specifier 172 is newly added as an offspring (a record appearing on child side) of the applicable record.

When adding a record, if there exists in data structure a record for which the set relation is specified by the table definition but which is not specified by the addition contents specifier 172, a record having NULL as column value is added before adding the above record having a column with the addition contents specified by the addition contents specifier 172 as its child.

Figures 20, 21:
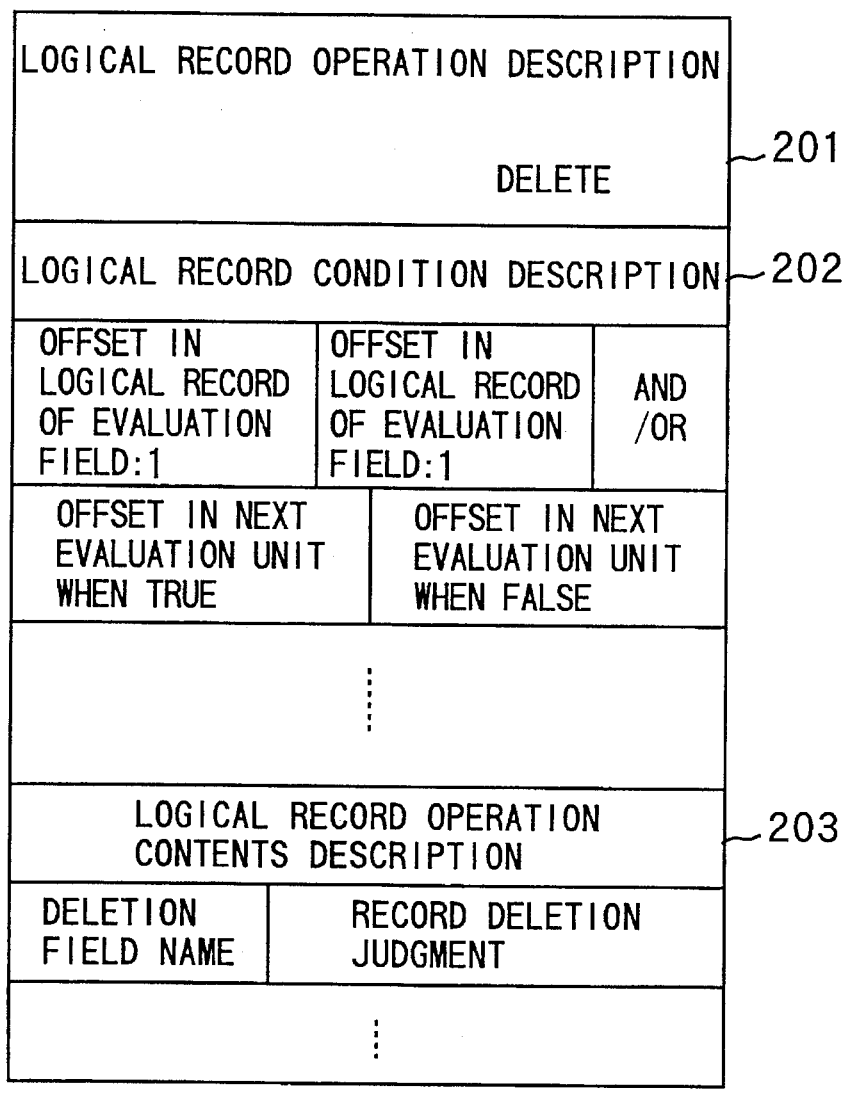
FIG. 20 is a diagram to show the configuration of a deletion request query.
FIG. 21 is a diagram to show an example of an access module when deletion is requested.

FIG. 20 shows a specific example of deletion request query in data manipulation language for a relational database. The deletion request query comprises a table name specifier 191 and deletion contents specifier 192. FIG. 21 gives an access module generated by the access module generating means 9 when deletion is requested, which is a specific example showing the difference from the retrieval processing. The access module comprises logical record operation description 201, logical record condition description 202 and logical record operation contents description 203.

When the user inputs a deletion request query from the input means 1, the query analyzing means 2 checks whether the deletion request query input is legal (Step 21), and, if so, sends the specified table name, the deletion column (field) name and the deletion contents to the deletion condition analyzing means 5 (Steps 22 and 27). If not, the error message is output to the output means 11. In this embodiment, a column in the basic record is always specified as the deletion contents specifier 202.

The deletion request analyzing means 7, like the retrieval condition analyzing means 4, generates a condition tree deeming the deletion contents as a retrieval condition expression and sends the condition tree with the table name, the deletion column (field) name and the deletion contents to the access module generating means 9.

The access module generating means 9 generates an access module as with a retrieval request, but logical record operation contents description 203, which describes the deletion contents, is added in logical record operation as shown in FIG. 21 (Step 1009).

The access module executing means 10 executes the access modules one by one as in the case of a retrieval request, but in the logical record operation, it is checked whether any basic record satisfies all deletion contents specified by the deletion contents specifier 192. If such a record exists, the column of the basic record specified by the deletion contents specifier 192 is deleted(set to NULL).

Here, other columns (columns not registered to the logical record as table or those registered to the logical record as table but not specified by the deletion contents specifier 192) of the basic record are not deleted. If such a record does not exist, the error message is sent to the output means 11.

As described above, by generating a record relation tree and a condition tree based on a query in data manipulation language for a relational database, and therefrom generating access modules for direct access to the hierarchical database file 13 and executing the access modules one by one, even for a complicated data processing request, access operation can be made easy as in the access to a relational database file.

Obviously many modifications and variations of the present invention are possible. It is intended to cover in the appended claims all such modifications as fall within the true spirit and scope of the invention.

What is claimed is:

1. A database access system which treats a network type database file as a relational type database file, comprising:

input means for inputting a query in a data manipulation language for a relational database;

query analyzing means for analyzing said query input at said input means;

relation record combining means for generating a record relation tree prescribing relations among records when said query is for table definition;

data operation condition analyzing means for resolving specified data operation conditions into sets of binary operations and generating condition trees having binary operators constituting the binary operations as nodes when said query is a data operation request;

access module generating means for generating access modules prescribing conditions and access procedures for access to said hierarchical network type database file by adding said condition trees to said record relation tree according to predetermined rules;

access module executing means for analyzing said access modules one by one and executing the access procedures; and output means for outputting the execution result of the access module executing means.

2. A database access system of claim 1 provided with a record relation tree storing means to store the record relation trees generated by said relation record combining means.

3. A database system of claim 1 wherein said data operation condition analyzing means is a retrieval condition analyzing means which generates a condition tree based on a retrieval request query.

4. A database system of claim 1 wherein said data operation condition analyzing means is an update condition analyzing means which generates a condition tree based on an update request query.

5. A database system of claim 1 wherein said data operation condition analyzing means is an addition condition analyzing means which generates a condition tree based on an addition request query.

6. A database system of claim 1 wherein said data operation condition analyzing means is a deletion condition analyzing means which generates a condition tree based on a deletion request query.

7. A database system as recited in claim 1, wherein said data operation condition analyzing means generates a condition tree including binary operators AND and OR in said data operation conditions, and adds a partial tree of binary operators other than AND and OR under a node of said condition tree.

8. A database access system which treats a network type database file as a relational type database file, comprising:

input means for inputting a query in a data manipulation language for a relational database;

query analyzing means for analyzing said query input at said input means;

relation record combining means for generating a record relation tree prescribing relations among records when said query is for table definition;

record relation tree storing means for storing the generated record relation tree;

data operation condition analyzing means which, when said query is a retrieval, update, addition or deletion request, resolves specified retrieval, update, addition or deletion conditions into sets of binary operations and generates condition trees having binary operators constituting the binary operations as nodes;

access module generating means for generating access modules prescribing conditions and access procedures for access to said network type database file by adding said condition trees to said record relation tree according to predetermined rules;

access module executing means for analyzing said access modules one by one and executing the access procedures; and output means for outputting the execution result of the access module executing means.

9. A database system of claim 8 wherein said data operation condition analyzing means comprises retrieval condition analyzing means, update condition analyzing means, addition condition analyzing means and deletion condition analyzing means.

10. A database system as recited in claim 8, wherein said data operation condition analyzing means generates a condition tree including binary operators AND and OR, and adds a partial tree of binary operators other than AND and OR under a node of said condition tree.

11. A database access system as recited in claim 7, wherein, when said query is for table definition, said relation record combining means generates the record relation tree according to said query for table definition including a basic record serving as a reference of table definition and relations among records and a data structure defined in said network type database, said record relation tree having the basic record as a root and other records as nodes or leaves.

12. A database access system which treats a network type database file as a relational type database file, comprising:

input means for inputting a query in a data manipulation language for a relational database;

query analyzing means for analyzing said query input at said input means;

relation record combining means for generating a record relation tree prescribing relations among records according to said query for table definition including a basic record serving as a reference of table definition and relations among records and a data structure defined in said network type database when said query is for table definition, said record relation tree having the basic record as a root and other records as nodes or leaves;

data operation condition analyzing means for resolving specified data operation conditions into sets of binary operations and generating condition trees having binary operators constituting the binary operations as nodes when said query is a data operation request;

access module generating means for generating access modules prescribing conditions and procedures for access to said network type database file by adding said condition trees to said record relation tree according to predetermined rules;

access module executing means for analyzing said access modules one by one and executing the access procedures; and output means for outputting the execution result of the access module executing means.

* * * * *